United States Patent
Bontu et al.

(10) Patent No.: US 8,472,406 B2
(45) Date of Patent: *Jun. 25, 2013

(54) HANDOVER DATA INTEGRITY IN A WIRELESS DATA NETWORK

(75) Inventors: Chandra Sekhar Bontu, Nepean (CA); Prabaharan Kanesalingam, Kanata (CA); Devaki Chandramouli, Plano, TX (US)

(73) Assignee: Apple Inc., Cupertino, CA (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/241,820

(22) Filed: Sep. 23, 2011

(65) Prior Publication Data
US 2012/0026973 A1    Feb. 2, 2012

Related U.S. Application Data

(63) Continuation of application No. 12/244,506, filed on Oct. 2, 2008, now Pat. No. 8,045,525.

(60) Provisional application No. 60/976,953, filed on Oct. 2, 2007, provisional application No. 60/977,722, filed on Oct. 5, 2007.

(51) Int. Cl.
H04L 12/56    (2006.01)
H04W 36/00    (2009.01)
H04W 36/14    (2009.01)

(52) U.S. Cl.
USPC ........ 370/331; 370/390; 370/436; 455/432.1; 455/437; 455/442; 455/443

(58) Field of Classification Search
USPC ........................ 370/331–436; 455/432.1–561
See application file for complete search history.

(56) References Cited

U.S. PATENT DOCUMENTS
2007/0104148 A1    5/2007    Kang et al.
2008/0279150 A1    11/2008    Shousterman et al.

*Primary Examiner* — Afsar M Qureshi
(74) *Attorney, Agent, or Firm* — Meyertons, Hood, Kivlin, Kowert & Goetzel, P.C.

(57) ABSTRACT

A method and apparatus for handover data integrity of a mobile station in a wireless data network with a plurality of wireless network service areas. The method and apparatus includes initiating handover by a mobile station, identifying a target access service network (ASN) for handover from a serving ASN. When the target ASN is identified, receive a data integrity capability from the target ASN, and determine whether a direct data delivery mode is available as a data integrity mode. When a direct data delivery mode is available, direct data delivery is performed with the data associated with the service flow from the serving ASN to the target ASN.

38 Claims, 7 Drawing Sheets handover data integrity
(multi-unicasting data delivery mode)

handover data integrity
(direct data delivery mode)

mutli-unicasting handover data integrity direct delivery handover
data integrity
via direct path A
(R8 interface)

direct delivery handover
data integrity
via direct path B
(via anchor ASN 202)

HANDOVER DATA INTEGRITY IN A WIRELESS DATA NETWORK

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 12/244,506, entitled "Handover Data Integrity in a Wireless Data Network," filed Oct. 2, 2008, pending, which claims priority pursuant to 35 U.S.C. §119(e) to the following U.S. Provisional Patent Applications which are hereby incorporated herein by reference in their entirety and made part of the present U.S. Utility Patent Application for all purposes:
   a. U.S. Provisional Application Ser. No. 60/976,953, entitled "Data Integrity Mechanism Using R8 for profile-C Configuration," filed Oct. 2, 2007, expired, and
   b. U.S. Provisional Application Ser. No. 60/977,722, entitled "Data Integrity Mechanism during Handover for WiMAX," filed Oct. 5, 2007, expired.

SPECIFICATION

1. Technical Field

The present invention relates to wireless data communications and, more particularly, data integrity for mobile station handovers.

2. Related Art

Communication systems are known to support wireless and wire lined communications between wireless and/or wire lined communication devices. Such communication systems range from national and/or international cellular telephone systems to the Internet to point-to-point in-home wireless networks. Each type of communication system is constructed, and hence operates, in accordance with one or more communication standards. For instance, wireless communication systems may operate in accordance with one or more standards, including, but not limited to, IEEE 802.11, WiMAX (IEEE 802.16e), personal area network communication protocols such as Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Typically, a mobile station engages in handover operations when its serving Access Service Network (ASN) is unable to continue providing wireless broadband data transmissions due to either interference with the signal transmissions, excessive distance from the serving ASN that deteriorates the signal-to-noise ratio, et cetera. The mobile station then engages in handover, in which a service flow may have a high quality of service (QoS) requirement that does not readily suffer dropped data during a mobile station handover (such as video, voice, multimedia, et cetera). Some techniques for handover data integrity are heavy-handed and require significant network memory and processing resources.

Thus, a need exists for a more subtle data integrity method and apparatus alternative for providing data integrity during mobile station handovers in a broadband wireless network. Such a method and apparatus would include consideration of data integrity capabilities of a target ASN, and acting upon these considerations during the handover operations.

SUMMARY

A method and apparatus for maintaining handover data integrity during handover of a mobile station in a wireless data network having a plurality of wireless network service areas, which includes, upon initiation of a handover by a mobile station, identifying at least one target access service network (ASN) for handover from a serving ASN that services wireless data communications with the mobile station. When at least one target ASN is identified, receiving a data integrity capability from the at least one target ASN. Based on the received data integrity capability, determining whether a direct data delivery mode is available as a data integrity mode. When the direct data delivery mode is available as a data integrity mode, direct data delivery if performed with the data associated with the service flow from the serving ASN to the at least one target ASN. When the direct data delivery mode is not available as a data integrity mode, the data is broadcast via a multi-unicast to the at least one target ASN and the serving ASN. When the direct data delivery is accomplished, the mobile station handover is completed from the serving ASN to one of the target ASNs.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

A method and apparatus relates to maintaining handover data integrity for a mobile station as it transitions from a serving ASN to a target ASN in a handover operation. During service interruption to a mobile station (that is, the break before making the transfer to the target ASN), the downlink information to the mobile station is stored or buffered, forwarded, and transmitted when once the service connection is re-established at the target ASN. Provided is increasing the efficiency for buffer optimization to reduce the reliance on serving and target ASN resources for data integrity and reducing data loss to the mobile station.

Figure 1:
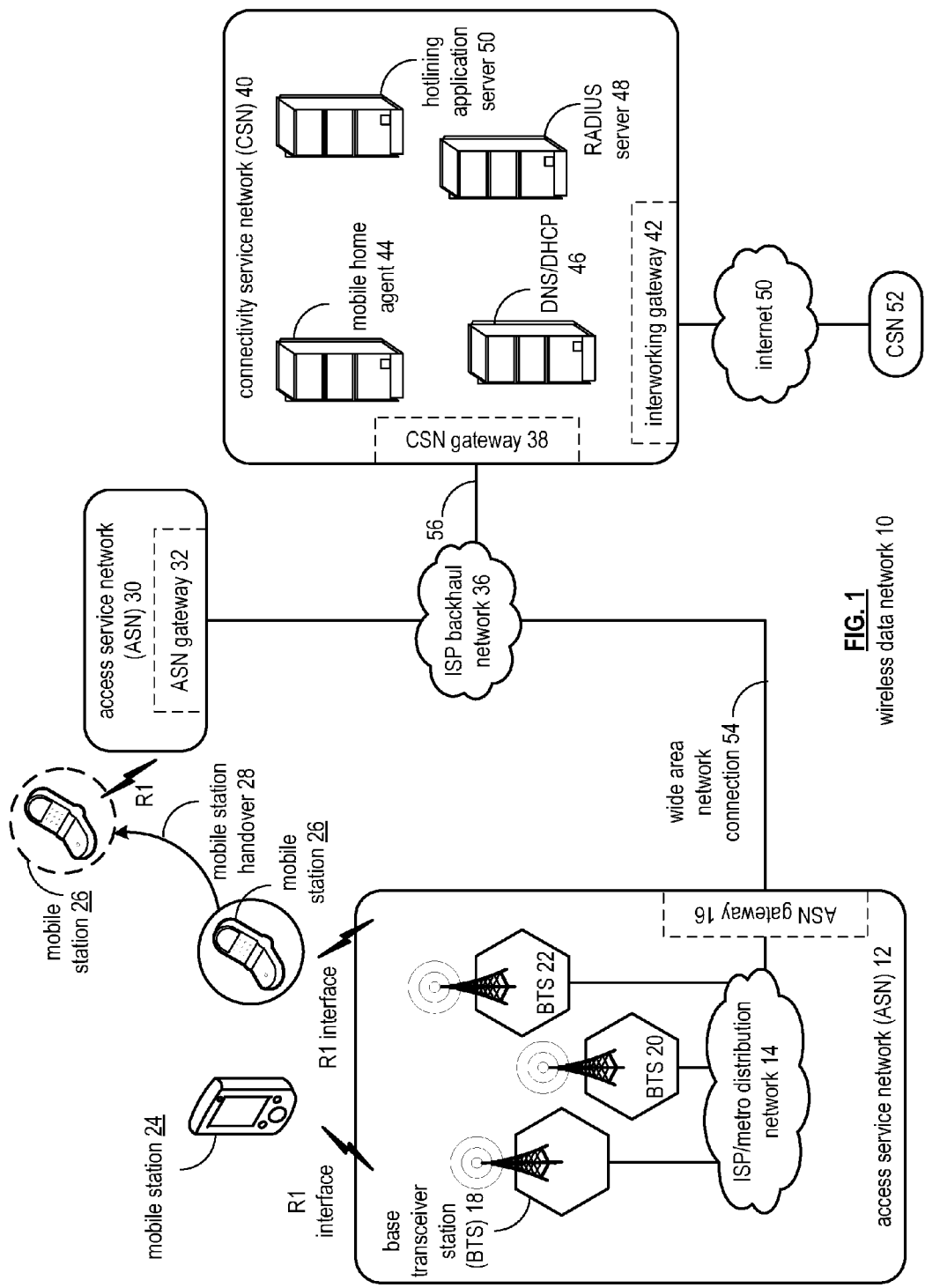
FIG. 1 is a functional block diagram illustrating a wireless data network that includes a plurality of access service networks (ASNs), a connectivity service network (CSN), a plurality of wireless communication devices and a backhaul network.

FIG. 1 is a functional block diagram illustrating a wireless data system 10 that includes circuit devices and network elements and operation thereof. More specifically, a plurality of network service areas 12, 30 and 40 are a part of a network 10. Network 10 includes a plurality of access service networks (ASNs) 12 and 30, a plurality of wireless communication devices 24 and 26, a connectivity service network (CSN) 40, and a network backhaul component including an ISP distribution network 34 and an ISP backhaul network 36. The wireless communication devices may be a personal digital assistant 24, a mobile station 26, a laptop computer, a handheld computer, and the like.

The wireless data network 10 provides a broadband data capacity intended for metropolitan area networks. Examples of such broadband data capacity networks are those under WiMAX specifications (also referred to, for broadband wireless technologies, as the IEEE 802.16e standards specifications), Long Term Evolution (LTE) wireless networks specifications (which is included in the UMTS/4GSM family of wireless technologies), et cetera. Generally, networks based upon WiMAX specifications can provide broadband wireless access (BWA) up to 30 miles for fixed wireless stations, and 3-to-10 miles for mobile stations.

The ASNs 12 and 30 are operably coupled to the network backhaul component that includes an ISP backhaul network 36. The network backhaul component, which may include a router, switch, bridge, modem, system controller, et cetera, provides a wide area network connection 54 for the wireless data network 10 to an external network element, such as the connectivity service network (CSN) 40. The backhaul network 36 may be implemented as an optical Ethernet and carrier Ethernet/provider backbone transport backhaul to support the bandwidth requirements for WiMAX service.

Each of the ASNs 12 and 30 include a plurality of base station transceivers, a distribution network, and an ASN gateway for coupling to the wide area network connection 54. The base transceiver stations have an associated antenna or antenna array to facilitate wireless communication with wireless communication devices in an associated coverage area.

Generally, any ASN within a data network may serve as a data anchor point or data distribution point, so that it serves as an R3 interface with the CSN 40. Also, any ASN within a data network is capable of being a serving ASN with R4 interface protocols. Aspects relating to serving ASNs and anchor ASNs are discussed in detail with reference to FIGS. 2-7.

Referring to ASN 12, for example, the wireless communication devices 24 and 26 register with the particular base transceiver station, such as BTS 18, 20, or 22, to receive broadband data services from the wireless data network. To facilitate communications, the wireless communication devices include a built-in radio and/or is coupled to a radio.

The ASN gateways 16 and 32 are network points that permit the ASN 12 to access other portions of the wireless data network 10, including access to Internet service providers. The ASN gateway 16 may also serve as a proxy server and/or a firewall server, and may be associated with a router to direct data packets and a switch for directing data paths in-and-out of the gateway.

The ASN gateway 16 may be implemented as distributed and centralized deployment architectures, based on WiMAX Forum NWG Profile C specifications, for example. A distributed ASN gateway architecture provides for ASN gateway functionality that may reside on a BTS. Under Profile C, the handover controller apparatus resides with the BTS. The centralized ASN gateway architecture provides for scalability and increased data bandwidth capacity. The Internet service provider (ISP)/metro distribution network 14 receives packet data from the wide area network connection 54 via the ASN gateway 16. The ISP/metro distribution network 14 distributes the data packets for transmission to a mobile station via the BTS serving the mobile station via an R1 interface, which is an air interface (the physical and medium access control interface) between the mobile station and the ASN 12. Detailed discussion of the air interface is discussed in greater detail in the IEEE 802.16e specification.

A connectivity service network (CSN) 40 is coupled to the ISP backhaul network 35 via the wide area network connection 56 through a CSN gateway 38. The CSN 40 also provides access to another CSN 52 through the Internet 50 via an Interworking (IW) gateway 42.

The CSN 40 provides control-and-management functions and pre/postpaid billing applications services to mobile stations 24 and 25 via the access via the ASNs 12 and 32. For example, control-and-management functions include Authentication, Authorization, and Accounting (AAA) and mobility via a mobile home agent (HA) server 44, domain name service/dynamic host configuration protocol (DNS/DHCP) by server 46, Remote Authentication Dial In User Service (RADIUS) to provide centralized access via server 48, and pre/postpaid billing solutions for revenue-generating services.

Hotlining applications provided by the server 50 may include user applications such as Voice over IP (VoIP) and IP multimedia subsystem-based solutions and multimedia subscriber services such as music, video, gaming, digital video surveillance, video conferencing, et cetera.

In operation, the mobile station 26 enters into a handover operation when the serving ASN, in this instance ASN 12, is unable to support data communications for a data service flow (SF) with the mobile station 26. For example, data communications become untenable as the distance increases beyond a suitable range, decreasing an acceptable signal-to-noise ratio with the serving ASN, the signal may be also encountering environmental distortion or interference from the environment, the BTS data throughput decreases due to traffic capacity, et cetera.

For a handover, a data integrity operation is applied. The data integrity level used in a handover is based upon the nature of the data service flow and the capability of a target ASN. For example, the Quality of Service (QoS) for a service flow may by high, such as for multimedia data or voice data communications, or may be low, such as for file data transfer which is more tolerant of sporadic or uneven data transmission. A target ASN may have sufficient system resources capable of accommodating various data integrity operations, from those data integrity operations that are overly system memory and processing resource intensive, such as multi-unicasting handover data integrity, or those that are less system memory and processing resource intensive, such as direct delivery handover data integrity. Also, a serving ASN may consider other factors for a prospective target ASN, such as the proximity of a prospective target ASN to the serving ASN, the signal strength of base transceiver station(s) (BTS) for a prospective target ASN, the available mobile station capacity of the BTS, et cetera.

Multi-unicasting involves continuously broadcasting the downlink data, which is directed to a mobile station, during the handover interruption period to a serving ASN and the target ASNs. If there are insufficient resources, for example, and the continuous broadcast of data by the anchor ASN may overflow the buffers of either the serving ASN or target ASNs, which may cause downlink data intended for the mobile station to be lost.

In contrast, direct delivery provides a data path to the at least one target ASN with a serving ASN for facilitating the transfer of the downlink data. The data may be forwarded to the target ASN on burst basis, as a service data unit (SDU) basis, as IP packets, et cetera, before the re-establishment of the MS with the target ASN, the handover data integrity operation is performed between an anchor ASN, the serving ASN, and at least one target ASN, implementing a negotiated data integrity operation, which is discussed in further detail with reference to FIGS. 2-7.

Figure 2:
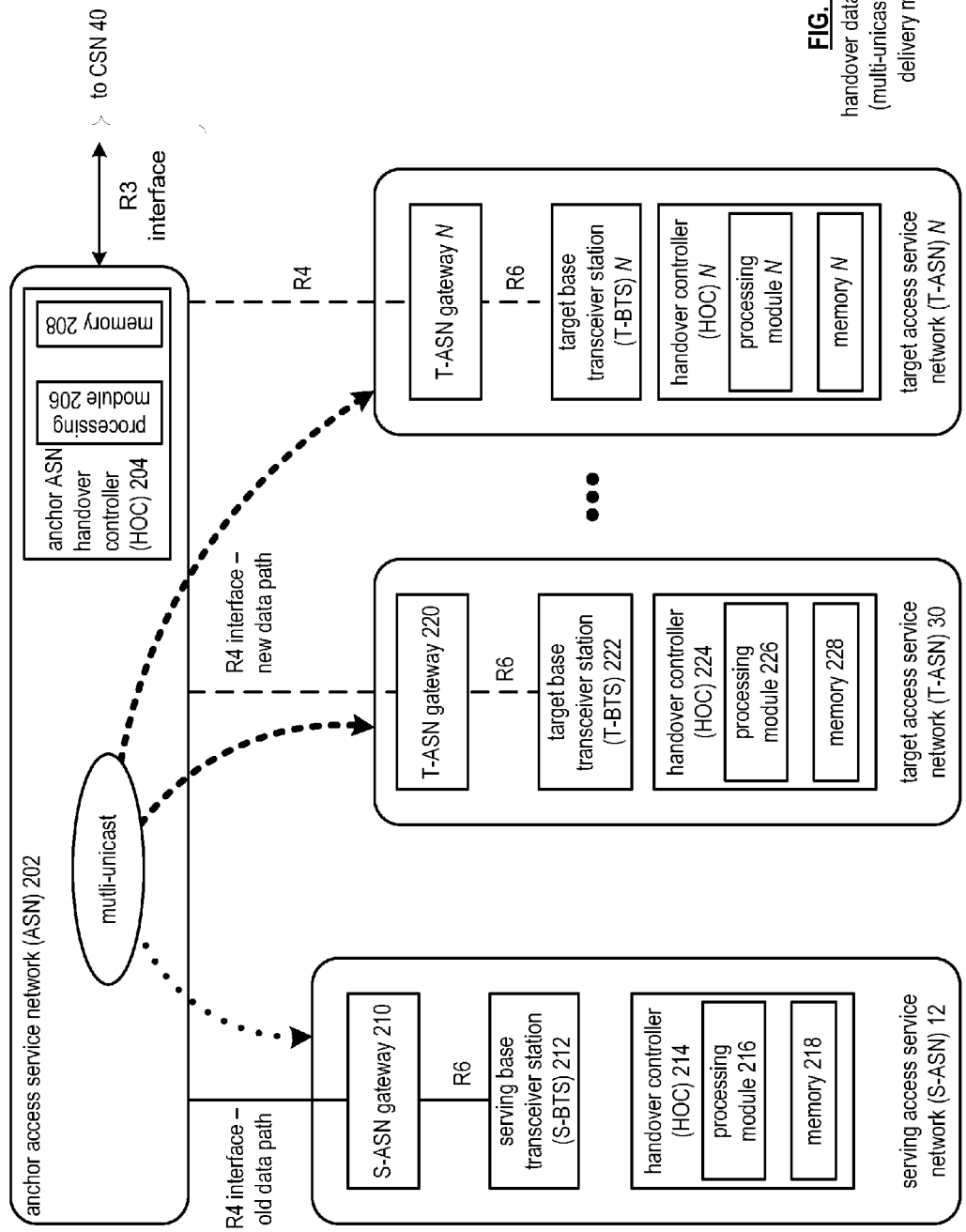
FIG. 2 is a schematic block diagram illustrating handover data integrity implementing multi-unicasting in a wireless data network that includes an anchor ASN, a serving ASN, and a plurality of target ASNs according to one embodiment of the present invention.

FIG. 2 is a schematic block diagram illustrating handover data integrity using multi-unicasting in a wireless data network that includes an anchor ASN 202, a serving ASN 12, and at least one target ASN 30, which may be multiple target ASNs up to "N." For clarity, the handover operations are discussed with reference to the at least one target access service network (T-ASN) 30. Generally, each of the serving ASN 12, the anchor ASN 202, and the target ASNs 30-N each have similar constructs, and to the discussion with respect to protocols and operational capabilities of each ASN is not repeated for the sake of clarity.

The serving ASN (S-ASN) 12 includes an S-ASN gateway 210 operably coupled to a serving base transceiver station (S-BTS) 212 via a R6 interface. A handover controller (HOC) 214 provides handover control operations with respect to a mobile station. The HOC 214 includes a processing module 216 and a memory 218.

The R6 interface between the S-ASN gateway 210 and the S-BTS 212 includes a set of control and bearer plane protocols for communication between the S-BTS 212 and the S-ASN gateway 210. The bearer plane includes an intra-ASN data path or inter-ASN tunnels between the S-BTS 212 and S-ASN gateway 210. The control plane includes protocols for Internet Protocol (IP) tunnel management (that is, establish, modify, and release) in accordance with the mobile station mobility events. The R6 interface path may also serve as a conduit for exchange of medium access control state information between neighboring base transceiver stations.

The S-ASN 12 is operably coupled to the anchor ASN 202 via an R4 interface, which includes a set of control and bearer plane protocols originating/terminating in various entities within an ASN that coordinate mobile station mobility between ASNs.

The at least one target ASN (T-ASN) 30 includes a T-ASN gateway 220 operably coupled to a target base transceiver station (T-BTS) 222 via a R6 interface. A handover controller (HOC) 224 provides handover control operations with respect to a mobile station. The HOC 224 includes a processing module 226 and a memory 228. The target ASN 30 is operably coupled to the anchor ASN 202 via a R4 interface. As noted, multiple target ASNs may be available based upon the suitability and resource availability of each additional T-ASN to accommodate handover operations.

The anchor ASN 202 operates to coordinate handover operations, including data integrity operations. The anchor ASN 202 includes an anchor ASN handover controller (HOC) 204. The HOC 204 includes a processing module 206 and a memory 208. The anchor ASN 202 is operably coupled to the CSN 40 to provide connectivity services to a mobile station via the serving ASN 12 and the target ASNs 30 through N. The anchor ASN 202 is operably coupled to the CSN 40 via an R3 interface, which supports Authentication, Authorization, and Accounting (AAA), policy enforcement, mobility management capabilities, et cetera. The R3 interface also encompasses the bearer plane methods (for example, tunneling) to transfer Internet Protocol (IP) data between the anchor ASN 202 and the CSN 40.

Memory 208, 218, and/or 228 through N may be a single memory device or a plurality of memory devices. Such a memory device may be a read-only memory, random access memory, volatile memory, non-volatile memory, static memory, dynamic memory, flash memory, and/or any device that stores digital information. Note that when the S-ASN 12 and/or T-ASN 30 through N implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. Memory 208, 218 and/or 228 through N stores, and processing module 206, 216 and/or 226 through N, executes, operational instructions corresponding to at least some of the functions illustrated herein. Memory 208, 218, and/or 228 also provide buffer capacity for the data integrity operations described herein.

During mobile station handover, the downlink data is stored during the service interruption time caused by the handover. During hard handover (that is, breaking the connection before making the handover), downlink data for the mobile station is stored during the service interruption time. Once the mobile station enters the target BTS 222, this stored data is transmitted to the mobile station, thus reducing the data loss from the downlink data path.

Generally, when system memory and processing resources are available, the simpler data integrity operation is via multi-unicasting data delivery. In multi-unicasting data delivery, the anchor ASN 202 forwards the downlink data for storage to the multiple viable target base stations 30 to N prior to the handover. After the mobile station moves to one of the target BTS 222 to N, the data traffic is resumed from the downlink data packet successfully transmitted by the serving BTS 212.

The multi-unicasting data delivery mode, however, requires provisioning, or setting aside, buffer capacity at all of the prospective base transceiver stations of the serving ASN and the target ASN(s) to store the downlink data. As a result, data buffering is done over a time duration that is significantly greater than the actual interruption time attributable to the mobile station handover, because the anchor ASN gateway is not immediately aware of when the mobile station indicates the handover is complete. Also, target ASNs 30 to N may not be capable of accommodating the resource requirements of the multi-unicasting data delivery mode, as indicated to the anchor ASN 202 by a target ASN through its data integrity capability. With the data integrity capability, the anchor ASN 202 can determine whether less resource intensive data integrity modes can be implemented, such as a direct data delivery mode.

Figure 3:
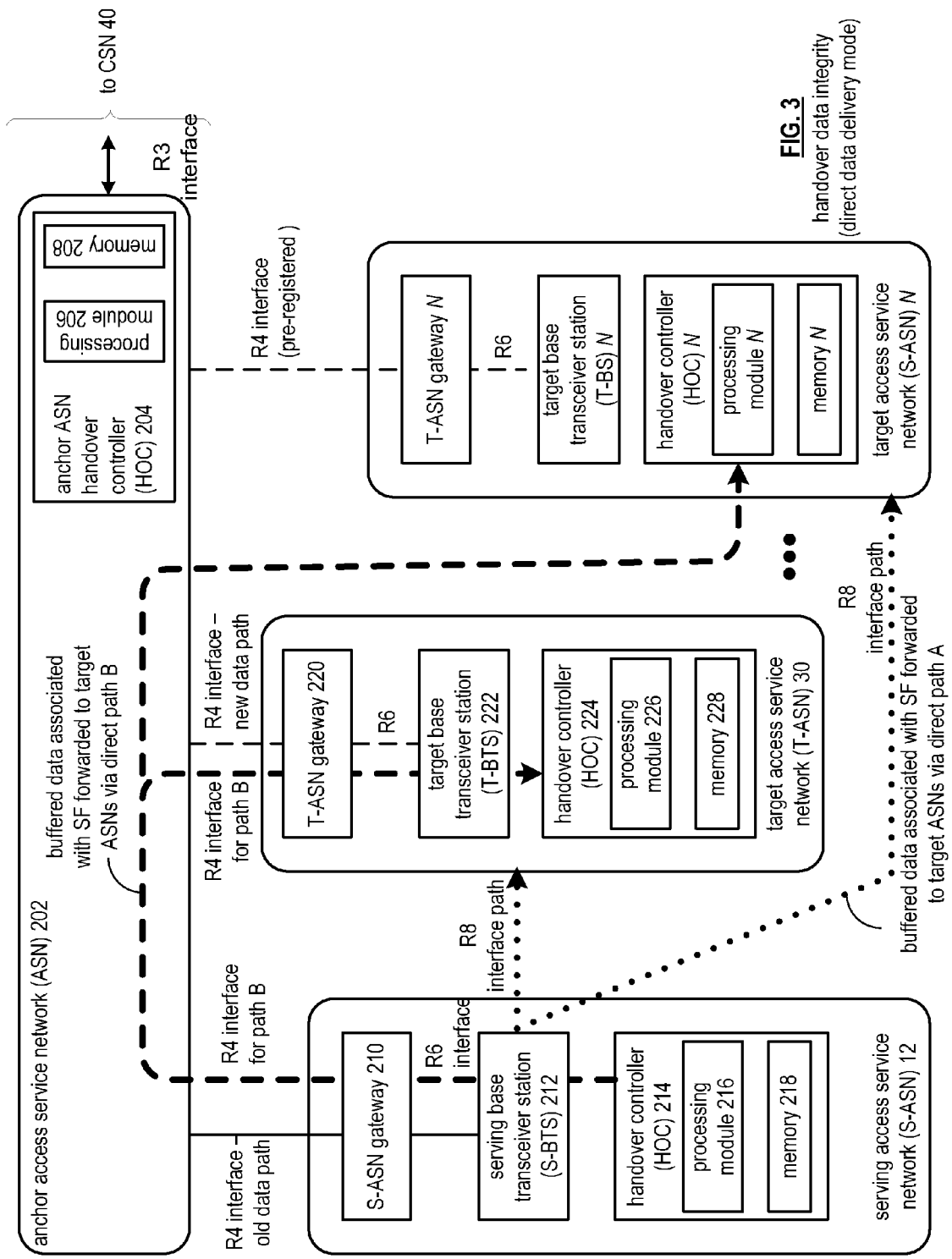
FIG. 3 is a schematic block diagram illustrating handover data integrity in direct data delivery mode in a wireless data network that includes an anchor ASN, a serving ASN, and a plurality of target ASNs according to one embodiment of the present invention.

FIG. 3 is a schematic block diagram illustrating handover data integrity using direct data delivery mode in a wireless data network that includes an anchor ASN 202, a serving ASN 12, and a plurality of target ASNs 30 to N.

In the direct data delivery mode, downlink data is buffered at the serving ASN 12, via the HOC 214, and the buffered data is forwarded to the selected target ASNs 30 to N, either before active handover or during active handover. Unlike the multi-unicast data integrity technique, the direct data delivery mode discussed herein is transparent to the anchor ASN 202.

As shown in FIG. 3, buffered data associated with a service flow for a mobile station may be forwarded either via a direct path A or a direct path B.

The direct path A is conducted via R8 interfaces established between the serving BTS 212 and the target BTS 222 to N. Establishing the direct path B is discussed in further detail with reference to FIG. 6.

The R8 interface includes a set of control plane message flows and, in some situations, bearer plane data flows between the base transceiver stations to aid in fast and seamless handover. The bearer plane includes protocols that allow the data transfer between Base Transceiver Stations involved in handover of a mobile station. The control plane includes inter-BTS communication protocols defined in IEEE 802.16e and other protocol sets that allow controlling the data transfer between the base transceiver stations involved in handover of a mobile station.

The direct path B provides a path via the anchor ASN 202 using pre-registered R4 interface paths. Establishing the direct path B is discussed in further detail with reference to FIG. 6.

Figure 4:
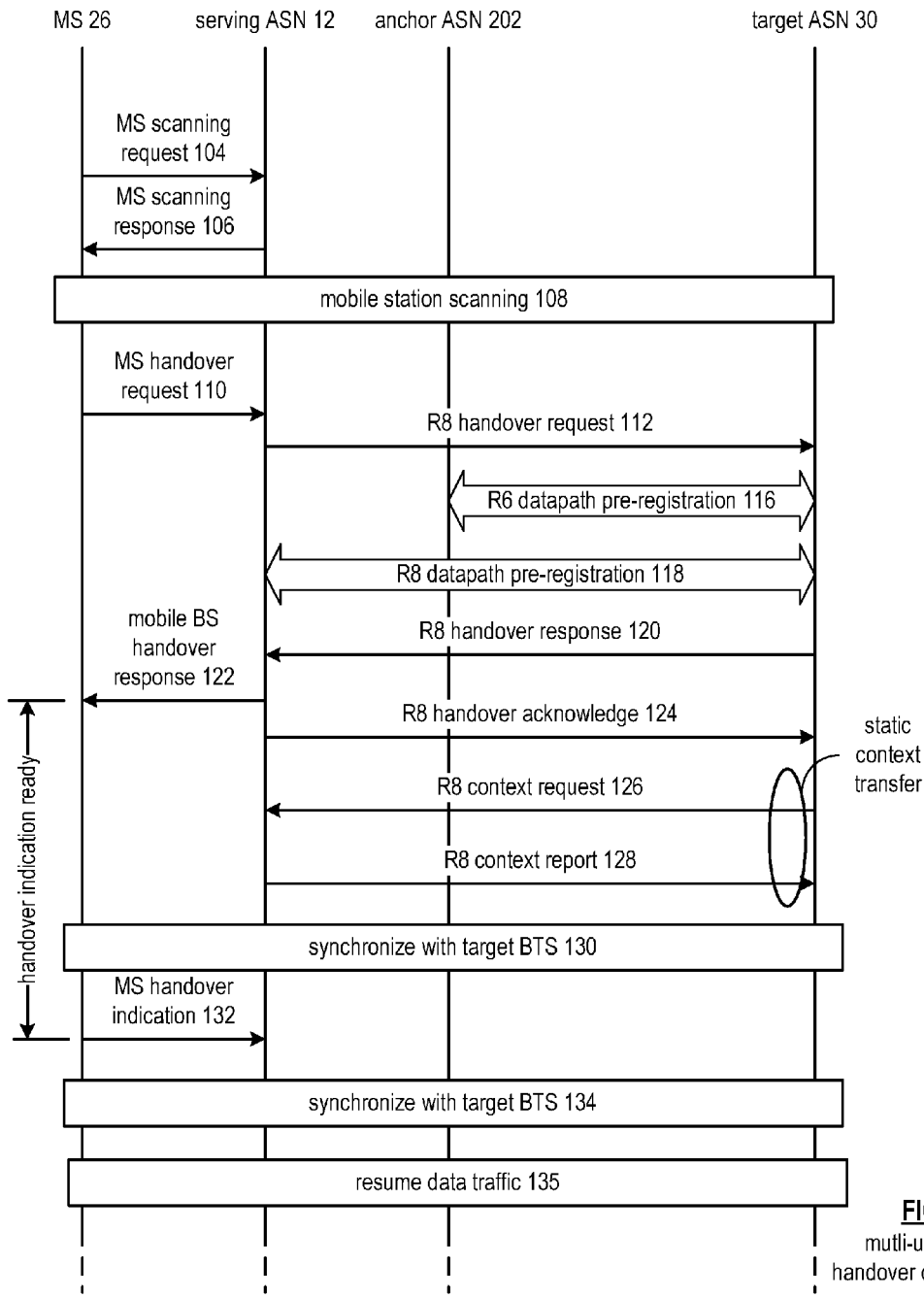
FIG. 4 is a signal flow diagram illustrating handover data integrity signaling implementing multi-unicasting handover data according to one embodiment of the present invention.

FIG. 4 is a signal flow diagram illustrating handover data integrity signaling using multi-unicasting handover data integrity.

In general, the potential target ASN is decided during the neighbor scanning via a mobile station scanning request 104 to the serving ASN 12. The serving ASN 12 responds with a MS scanning response 106, and then engages in mobile station scanning for potential target ASNs, such as the target ASN 30.

During the scanning, the anchor ASN 202 receives from the target ASNs the data integrity capability—that is, whether the target has the capability to engage in multi-unicasting handover data integrity operations (either through available resources, or whether the target has an override preference of the manner of data integrity to be performed). Based upon the data integrity capability, and the QoS characteristic of the data service flow, the anchor ASN 202 determines whether a direct data delivery mode s available. When the direct data delivery mode is not available, then the data integrity mode used is the multi-unicast integrity mode.

The mobile station sends a mobile handover request 110 to the base transceiver station 212 of the serving ASN 12, to indicate the intent to hand over to a different base transceiver station The target BTS 222 of the target ASN 30 receives from the serving ASN 12 an R8 handover request 112. Optionally, the handover request 112 may be made via the R6 interface relay function.

Pre-registration by the target ASN 30 of the R6 data path occurs at 116, and pre-registration by the target ASN 30 of the R8 data path occurs at 118. When the serving BTS 212 of the serving ASN 12 receives the handover response 120 from the target BTS 222 of the target ASN 30, the serving BTS 212 sends a mobile BS handover response 122 to the mobile station 26, and sends to the target ASN 30 a handover acknowledge 124. At this point, no downlink data is provided to the mobile station during the handover indication ready period. During this period, a static context transfer occurs as indicated via the R8 context request 126 and the R8 context report 128.

The anchor ASN 202 then multi-unicasts the buffered downlink data received from the serving ASN 12 to the target ASN 30 during the synchronize with target BTS 130 or following the MS handover indication 132 at the "synchronize with the target BTS 134." Subsequently, the downlink data communication with the mobile station 26 resumes data traffic 135.

Figure 5:
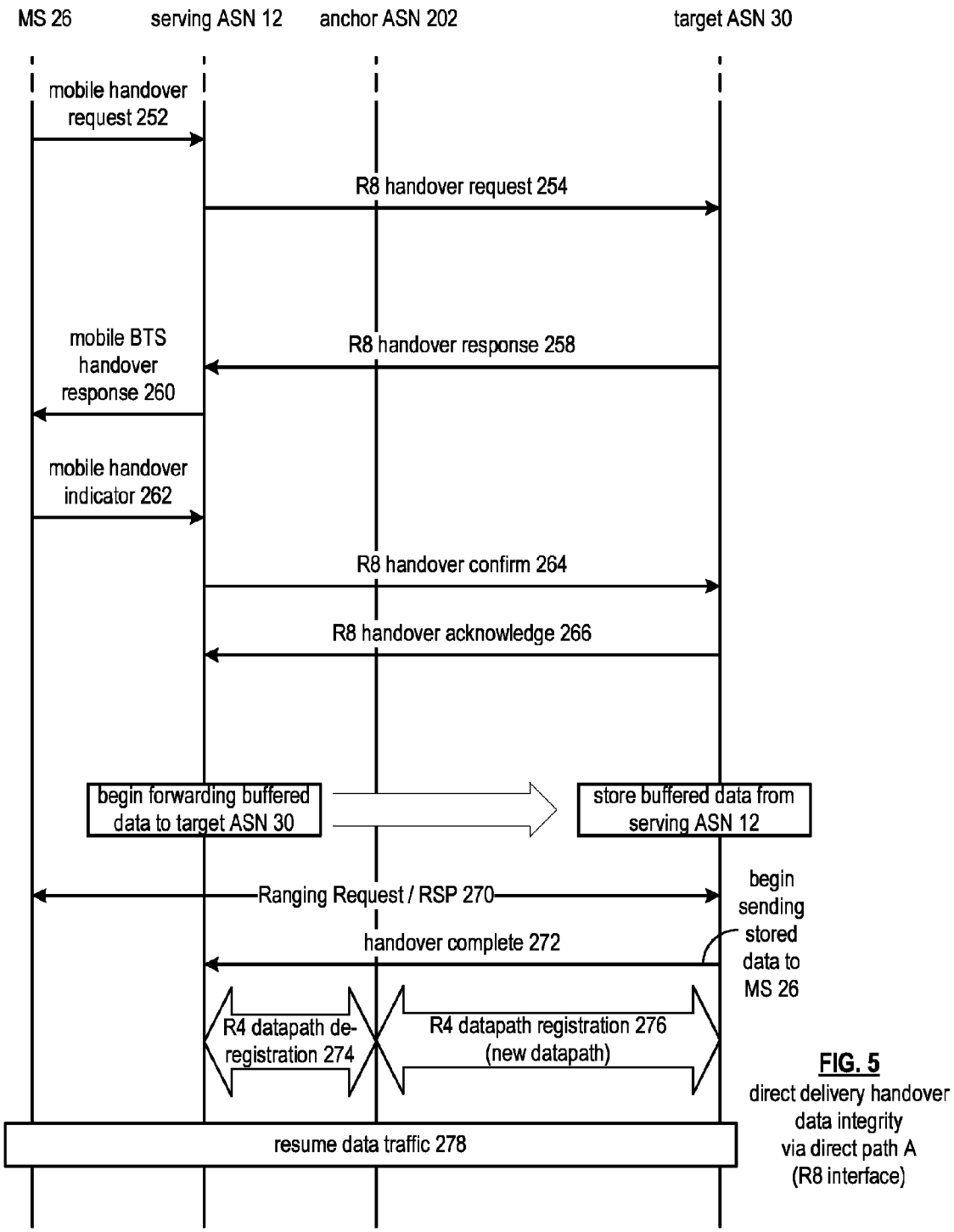
FIG. 5 is a signal flow diagram illustrating handover data integrity signaling implementing direct delivery through a data path between base transceiver stations according to one embodiment of the present invention.

FIG. 5 is a signal flow diagram illustrating handover data integrity signaling using direct delivery through a data path between base transceiver stations.

In general, referring to FIG. 4, the potential target ASN 30 (or multiple target ASNs) is decided during the neighbor scanning via a mobile station scanning request 104 to the serving ASN 12. The serving ASN 12 responds with a MS scanning response 106, and then engages in mobile station scanning for potential target ASNs, such as the target ASN 30.

During the scanning, the anchor ASN 202 receives from the target ASNs data integrity capability—that is, whether the target, or a plurality of targets, has the capability to engage in multi-unicasting handover data integrity operations (either through available resources, or whether the target has an override preference of the manner of data integrity to be performed). Based upon the data integrity capability, and the QoS characteristic of the data service flow, the anchor ASN 202 determines whether a direct data delivery mode s available. When the direct data delivery mode is available, then the direct data delivery integrity mode is used in the handover process.

In the example provided by FIG. 5, the direct path implemented is using the R8 interfaces used between base transceiver stations. Data delivery trigger is turned off in the data path pre registration procedure between the target ASN 30 and the anchor ASN 202 to avoid multi-unicasting to the target ASN 30 and the serving ASN 12.

As shown, the mobile station 26 sends a mobile handover request 252 to the serving ASN 12 indicating the intention to perform a handover operation. The serving ASN 12 sends a R8 handover request 254 to the target ASN 30, and in response receives a R8 handover response 258. The serving ASN 12 sends a mobile BTS handover response 260 to the mobile station 26 indicating that the preparation for the handover is complete.

To begin the handover, the mobile station 26 sends a mobile handover indicator message 262 to the serving ASN 12, which sends an R8 handover confirm message 264 to the target ASN 30. The target ASN 30 responds with an R8 handover acknowledge message 266 to the serving ASN 12.

For the purpose of setting a direct data path A between the serving ASN 12 and the target ASN 30, Generic Routing Encapsulation (GRE) keys for the R8 data path may be exchanged between the target ASN 30 and the serving ASN 12 via the R8 handover request 254/handover response 258 without sending an explicit path registration message. Different GRE keys represent the same service flow on different branches of the data path tree if the data is forwarded to multiple ASNs.

In beginning handover of the mobile station 26, upon receipt of mobile handover indicator message 262 with the selected target BTS 222 of the target ASN 30, the serving ASN 12 sends an R8 handover confirm message 264 to the target ASN 30. When the R8 data path between the target ASN 30 and the anchor ASN 202 is not already established, the target ASN 30 will pre-register the new R4 interface data path with the anchor ASN 202. Similarly, if the direct data path to the serving ASN 12 is not already established, the target ASN 30 will register a R8 data path at this point. The handover confirm message 264 may be used as a trigger for the forwarding of buffered data from the serving ASN 12 to the target ASN 30 over the R8 data path (see FIG. 3, direct path A).

Upon activation of the data path A, the serving ASN 12 initiates the data transfer to the target ASN 30 such as via a GRE tunnel, or in the alternative, may choose to buffer the data packets based upon local policies for the serving ASN 12. The target ASN 30 buffers these packets received over R8 in memory 228 of the target HOC 224.

The initial ranging contention slot for the broadband data network is used as part of network entry. A mobile station 26 transmits a ranging request (RNG-REQ) packet in the initial ranging contention slot. In response to receiving the RNG-REQ, the target ASN 30 provides a ranging response message 270, giving timing and power adjustment information to the mobile station 26. The mobile station 26 can then adjust the timing to account for transit delays and path loss of its transmissions such that the timing and power of the signal as received at the base station aligns with transmissions from other mobile stations.

A handover complete message 272 is sent by the target ASN 30 to the serving ASN 12, and the old R4 data path between the serving ASN 132 and the anchor ASN 202 is de-registered at 274. The new RF data path between the anchor ASN 202 and the target ASN 30 is registered at 276, and data traffic is resumed at 278.

Figure 6:
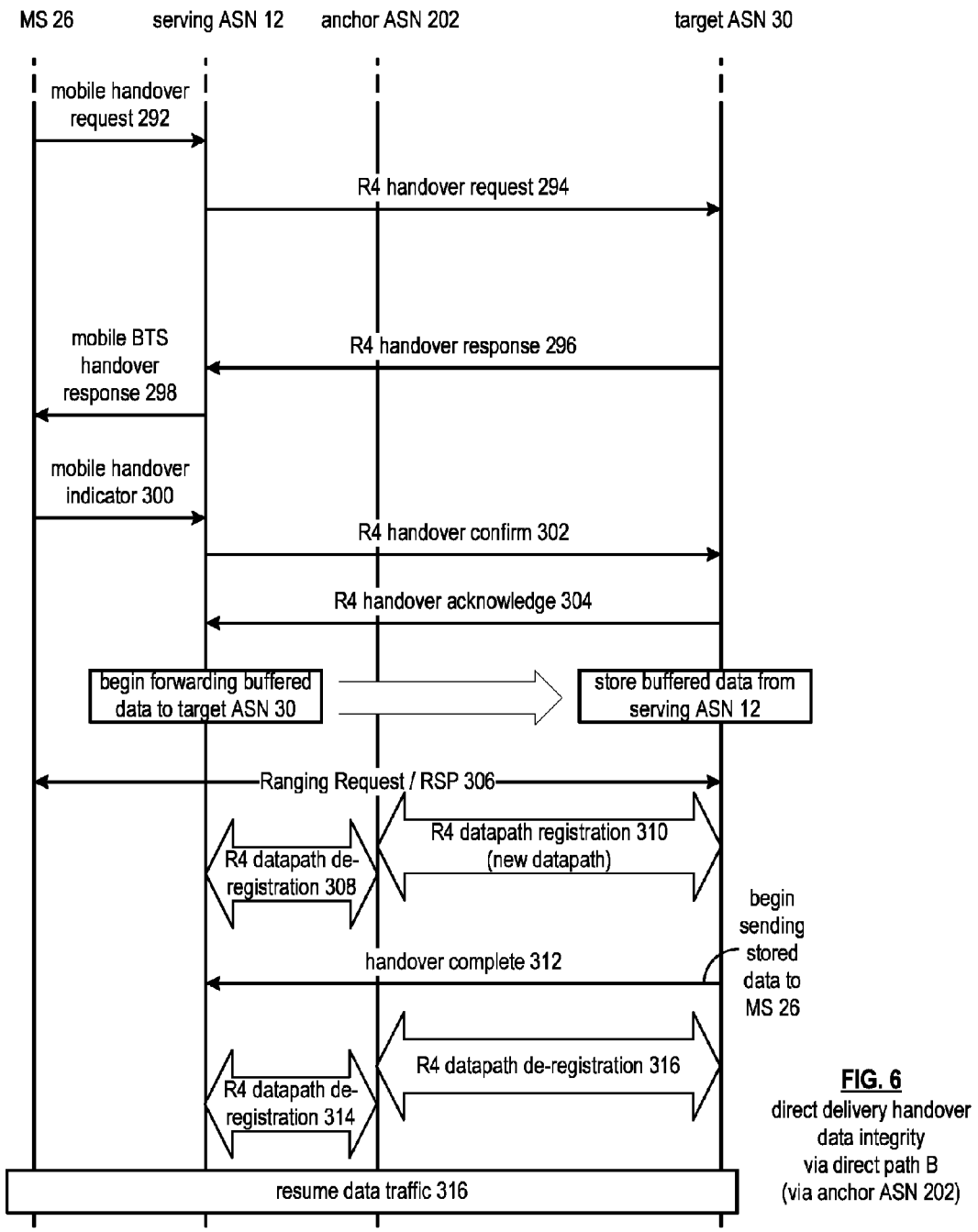
FIG. 6 is a signal flow diagram illustrating handover data integrity signaling implementing direct delivery through a data path through the anchor ASN according to another embodiment of the present invention.

FIG. 6 is a signal flow diagram illustrating handover data integrity signaling using direct delivery through a data path between base transceiver stations via the anchor ASN 202.

In general, referring to FIG. 4, the potential target ASN 30 (or multiple target ASNs) is decided during the neighbor scanning via a mobile station scanning request 104 to the serving ASN 12. The serving ASN 12 responds with a MS scanning response 106, and then engages in mobile station scanning for potential target ASNs, such as the target ASN 30.

During the scanning, the anchor ASN 202 receives from the target ASNs the data integrity capability—that is, whether the target has the capability to engage in multi-unicasting handover data integrity operations (either through available resources, or whether the target has an override preference of the manner of data integrity to be performed). Based upon the data integrity capability, and the QoS characteristic of the data service flow, the anchor ASN 202 determines whether a direct data delivery mode s available. When the direct data delivery mode is available, then the direct data delivery integrity mode is used in the handover process.

In the example provided by FIG. 6, the direct path implemented is using the R4 interfaces between the serving ASN 12 and the anchor ASN 202, and between the target ASN 30 and the anchor ASN 202, which will become the active data path following completion of the handover operation with the mobile station 26.

As shown, the mobile station 26 sends a mobile handover request 292 to the serving ASN 12 indicating the intention to perform a handover operation. The serving ASN 12 sends a R4 handover request 294 to the target ASN 30, and in response receives a R4 handover response 296. The serving ASN 12 sends a mobile BTS handover response 298 to the mobile station 26 indicating that the preparation for the handover is complete.

To start the handover, the mobile station 26 sends a mobile handover indicator message 300 to the serving ASN 12, which sends an R4 handover confirm message 302 to the target ASN 30. The target ASN 30 responds with an R4 handover acknowledge message 304 to the serving ASN 12.

In beginning handover of the mobile station 26, upon completion of the direct data path B based upon the R4 interfaces, the serving ASN 12 initiates the transfer of the buffered data from memory 218 to the memory 228 of target ASN 30, or in the alternative, may choose to buffer the data packets based upon local policies for the serving ASN 12. The target ASN 30 buffers these packets received over the data path B in memory 228 of the target HOC 224.

The initial ranging contention slot for the broadband data network is used as part of network entry. A mobile station 26 transmits a ranging request (RNG-REQ) packet in the initial ranging contention slot. In response to receiving the RNG-REQ, the target ASN 30 provides a ranging response message 306, giving timing and power adjustment information to the mobile station 26. The mobile station 26 can then adjust the timing to account for transit delays and path loss of its transmissions such that the timing and power of the signal as received at the base station aligns with transmissions from other mobile stations.

Upon successful re-entry of the mobile station 26 at the target ASN 30, the target ASN sends an R4 data path registration message 310, which requests setup of the new data path between the anchor ASN 202 and the target ASN 30, and notifies the anchor ASN 202 of the successful re-entry. Following the R4 data path registration 310, the anchor ASN 202 stops forwarding data packets towards the serving ASN 12, via the R4 data path de-registration 308 and switches data transmission to the target ASN 30 based upon the handover complete message 312.

Tear-down of the data path B then occurs with the R4 data path de-registration message 318 between the anchor ASN 202 and the target ASN 30, and with the R4 data path de-registration 314 between the anchor ASN 202 and the serving ASN 12. By tearing down the data path B as the last step, lost data packets are avoided in the event that data had been in transit to this point from the serving ASN 12 buffer of memory 218 to the buffer of memory 228 for the target ASN 30. The target ASN 30 resumes data traffic at message 316.

Figure 7:
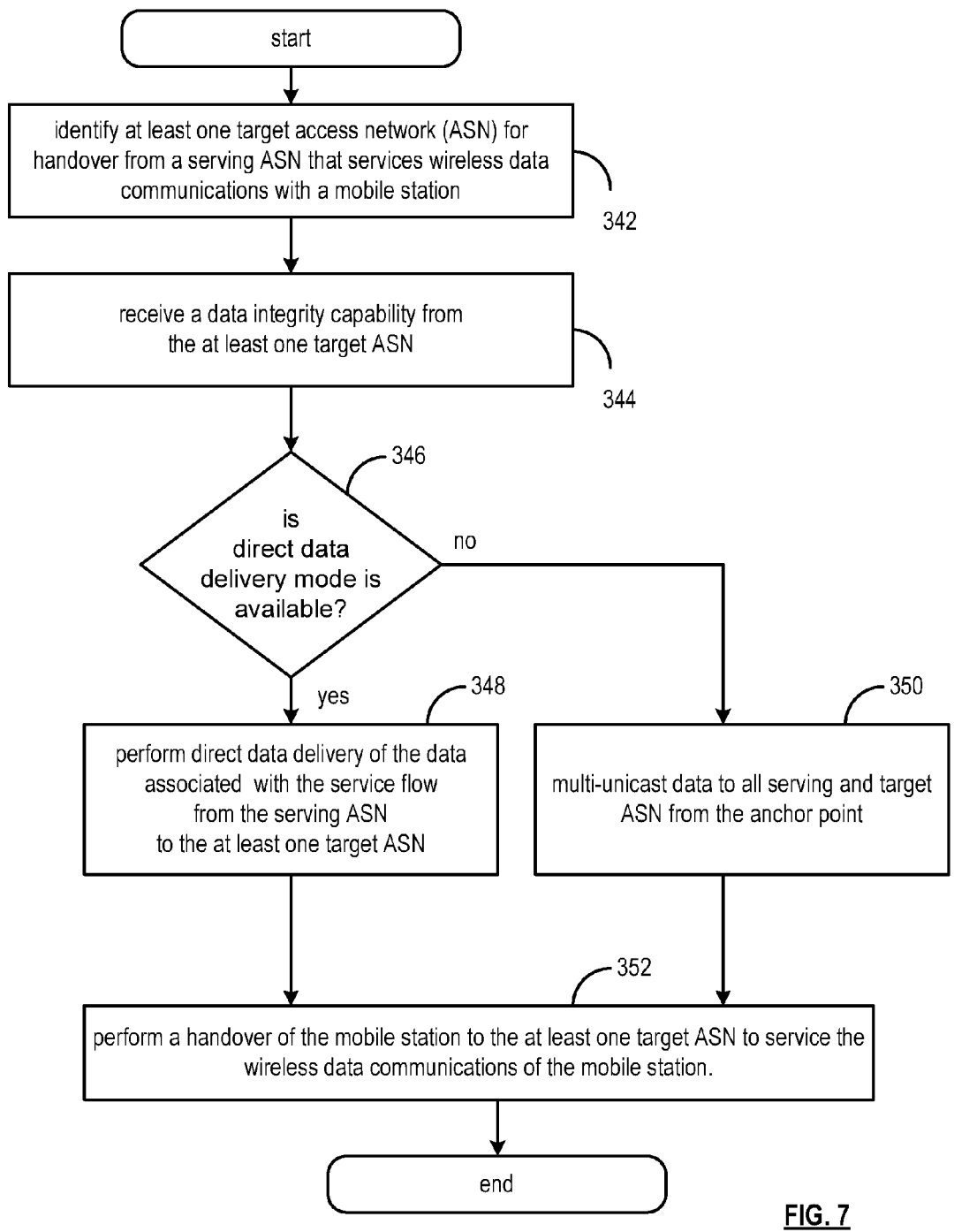
FIG. 7 is a flow diagram of a method for handover data integrity of a mobile station in a wireless data network according to an embodiment of the present invention.

FIG. 7 is a flow diagram of a method for handover data integrity of a mobile station in a wireless data network. Beginning at step 262 a handover controller for an anchor ASN identifies at least one target access service network (ASN) for handover from a serving ASN that services wireless data communications with a mobile station. The anchor ASN receives, at step 344, a data integrity capability from the at least one target ASN. The data integrity capability may be provided by the target ASN in a message format, frame format, packet format, in which the handover data integrity for the at least one target ASN is indicated via a bit, flag, word, signal, et cetera.

With the data integrity capability from the at least one target ASN, the anchor ASN negotiates and/or determines at step 346 whether a direct data delivery mode is available. The negotiation may take into consideration the Quality of Service (QoS) level for the data in the service flow (that is, the importance of data integrity to the service, such as multimedia, voice communications, file data transfer, et cetera), whether the at least one target lacks the memory and/or processor resources is unable to accommodate a multi-unicast data delivery, et cetera. Further, a target ASN may indicate, via the data integrity capability, an overriding preference for direct data delivery instead using the multi-unicasting handover data integrity operations. The direct data delivery mode provides a direct data path between the serving ASN and the target ASN, or may provide a direct data path to the serving ASN and the target ASN via the anchor ASN.

When the data integrity capability provided by the prospective target ASNs that can accommodate direct data delivery, then at step 348, a direct data path is provided to transfer buffered data associated with the service flow of the mobile station from the serving ASN to the at least one target ASN.

When the data integrity capability provided by the at least one target ASN cannot accommodates direct data delivery, then at step 350, the buffered data of the serving ASN associated with the service flow of the mobile station is multi-unicast from the anchor ASN to the at least one target ASN as well as to the serving ASN on a continuous-broadcast basis during the handover interruption to the mobile station, and engaging the memory and processing resources of the ASN during this period.

Following the forwarding of the buffered data to the target ASN in either of step 348 or step 350, handover of the mobile station to a target ASN of the at least one target ASN is completed at step 352, wherein the target ASN of the at least one target ASN begins servicing the wireless data communications with the mobile station.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that a first signal has a greater magnitude than a second signal, a favorable comparison may be achieved when the magnitude of the first signal is greater than that of the second signal or when the magnitude of the second signal is less than that of the first signal.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but, on the contrary, the invention is to cover all modifications, equivalents and alternatives falling within the spirit and scope of the present invention as defined by the claims. As may be seen, the described embodiments may be modified in many different ways without departing from the scope or teachings of the invention.

What is claimed is:

1. A method of operating a handover controller of an access service network of a wireless data network, the method comprising:
   receiving an indication of a data integrity capability of at least one access service network identified as a target access service network for handover of a service flow to mobile terminal;
   when the indicated data integrity capability accommodates direct data delivery of data associated with the service flow, initiating direct delivery of the data associated with the service flow from a serving access service network serving the mobile terminal to the target access service network; and
   when the indicated data integrity capability does not accommodate direct data delivery of data associated with the service flow, multi-unicasting the data associated with the service flow to the serving access service network and the target access service network.

2. The method of claim 1, further comprising buffering the data associated with the service flow.

3. The method of claim 2, wherein:
   the initiating the direct delivery of the data associated with the service flow includes initiating direct delivery of the buffered data during handover of the mobile terminal from the serving access service network to the target access service network; and
   the multi-unicasting the data associated with the service flow includes multi-casting the buffered data during handover of the mobile terminal from the serving access service network to the target access service network.

4. The method of claim 2, wherein:
   the initiating the direct delivery of the data associated with the service flow includes initiating direct delivery of the buffered data before handover of the mobile terminal from the serving access service network to the target access service network; and
   the multi-unicasting the data associated with the service flow includes multi-casting the buffered data before handover of the mobile terminal from the serving access service network to the target access service network.

5. The method of claim 1, wherein the initiating the direct delivery of the data associated with the service flow includes initiating direct delivery of the data associated with the service flow via at least one interface between the handover controller the target access service network.

6. The method of claim 5, wherein each interface between the handover controller and the target access service network is an R4 interface.

7. The method of claim 1, wherein the initiating the direct delivery of the data associated with the service flow includes initiating direct delivery of the data associated with the service flow via at least one interface between the serving access service network and the target access service network.

8. The method of claim 7, wherein the initiating direct delivery of the data associated with the service flow includes initiating direct delivery of the data associated with the service flow via at least one R8 interface between the serving access service network and the least one target access service network.

9. A handover controller of an access service network of a wireless data network, comprising:
   at least one processor; and
   at least one memory operably coupled to the at least one processor, the at least one memory storing instructions executable by the at least one processor to:
      receive an indication of a data integrity capability of at least one access service network identified as a target access service network for handover of a service flow to mobile terminal;
      initiate direct delivery of the data associated with the service flow from a serving access service network serving the mobile terminal to the target access service network when the indicated data integrity capability accommodates direct data delivery of data associated with the service flow; and
      multi-unicast the data associated with the service flow to the serving access service network and the target access service network when the indicated data integrity capability does not accommodate direct data delivery of data associated with the service flow.

10. The handover controller of claim 9, wherein the at least one processor and the at least one memory are operable to buffer the data associated with the service flow.

11. The handover controller of claim 10, wherein:
the instructions executable to initiate the direct delivery of the data associated with the service flow include instructions executable to initiate the direct delivery of the buffered data during handover of the mobile terminal from the serving access service network to the target access service network; and
the instructions executable to multi-unicast the data associated with the service flow include instructions executable to multi-cast the buffered data during handover of the mobile terminal from the serving access service network to the target access service network.

12. The handover controller of claim 10, wherein:
the instructions executable to initiate the direct delivery of the data associated with the service flow comprise instructions executable to initiate direct delivery of the buffered data before handover of the mobile terminal from the serving access service network to the target access service network; and
the instructions executable to multi-unicast the data associated with the service flow comprise instructions executable to multi-cast the buffered data before handover of the mobile terminal from the serving access service network to the target access service network.

13. The handover controller of claim 9, wherein the instructions executable to initiate the direct delivery of the data associated with the service flow include instructions executable to initiate the direct delivery of the data associated with the service flow via at least one interface between the handover controller the target access service network.

14. The handover controller of claim 13, wherein each interface between the handover controller and the target access service network is an R4 interface.

15. The handover controller of claim 9, wherein the instructions executable to initiate direct delivery of the data associated with the service flow comprise instructions executable to initiate direct delivery of the data associated with the service flow via at least one interface between the serving access service network and the target access service network.

16. The handover controller of claim 15, wherein the instructions executable to initiate the direct delivery of the data associated with the service flow comprise instructions executable to initiate the direct delivery of the data associated with the service flow via at least one R8 interface between the serving access service network and the target access service network.

17. A method of operating a handover controller of an access service network of a wireless data network, the method comprising:
receiving a scanning signal associated with a mobile station seeking a handover; and
transmitting to an anchor access service network serving the mobile station an indication of a data integrity capability supported by the handover controller in response to the received scanning signal.

18. The method of claim 17, further comprising receiving data associated with a service flow to the mobile station.

19. The method of claim 18, wherein the receiving the data associated with the service flow includes receiving the data associated with the service flow via an interface to the anchor access service network.

20. The method of claim 19, wherein the receiving the data associated with the service flow comprises receiving the data associated with the service flow via an R4 interface to the anchor access service network.

21. The method of claim 18, wherein the receiving the data associated with the service flow includes receiving the data associated with the service flow via an interface to a serving access service network currently serving the mobile station.

22. The method of claim 21, wherein the receiving data associated with the service flow includes receiving data associated with the service flow via an R8 interface to the serving access service network.

23. A handover controller of an access service network of a wireless data network, comprising:
at least one processor; and
at least one memory operably coupled to the at least one processor, the at least one memory storing instructions executable by the at least one processor to:
receive a scanning signal associated with a mobile station seeking a handover; and
transmit to an anchor access service network serving the mobile station an indication of a data integrity capability supported by the handover controller in response to the received scanning signal.

24. The handover controller of claim 23, wherein the instructions further comprise instructions executable to receive data associated with a service flow to the mobile station.

25. The handover controller of claim 24, wherein the instructions executable to receive the data associated with the service flow include instructions executable to receive data associated with the service flow via an interface to the anchor access service network.

26. The handover controller of claim 25, wherein the instructions executable to receive the data associated with the service flow comprise instructions executable to receive the data associated with the service flow via an R4 interface to the anchor access service network.

27. The handover controller of claim 24, wherein the instructions executable to receive the data associated with the service flow include instructions executable to receive the data associated with the service flow via an interface to a serving access service network currently serving the mobile station.

28. The handover controller of claim 27, wherein the instructions executable to receive the data associated with the service flow include instructions executable to receive the data associated with the service flow via an R8 interface to the serving access service network.

29. A method of operating a handover controller of an access service network of a wireless data network, the method comprising:
receiving a handover request from a mobile station served by the access service network;
receiving a signal initiating delivery of data associated with a service flow to the mobile station to target access service network from an anchor access service network serving the mobile station; and
initiating delivery of data associated with the service flow to the target access service network in response to the received signal.

30. The method of claim 29, wherein initiating the delivery of the data associated with the service flow includes sending the data associated with the service flow to the anchor access service network.

31. The method of claim 30, wherein initiating wherein initiating the delivery of the data associated with the service flow includes sending the data associated with the service flow to the anchor access service network over an R4 interface.

32. The method of claim 29, wherein initiating the delivery of the data associated with the service flow includes sending the data associated with the service flow to the target access service network.

33. The method of claim 32, wherein initiating wherein initiating delivery of data associated with the service flow comprises sending the data associated with the service flow to the target access service network over an R8 interface.

34. A handover controller of an access service network of a wireless data network, comprising:
  at least one processor; and
  at least one memory operably coupled to the at least one processor, the at least one memory storing instructions executable by the at least one processor to:
    receive a handover request from a mobile station served by the access service network;
    receive a signal initiating delivery of data associated with a service flow to the mobile station to a target access service network from an anchor access service network serving the mobile station; and
    initiate delivery of data associated with the service flow to the target access service network in response to the received signal.

35. The handover controller of claim 34, wherein the instructions executable to initiate delivery of data associated with the service flow comprise instructions executable to send the data associated with the service flow to the anchor access service network.

36. The handover controller of claim 35, wherein the instructions executable to initiate delivery of data associated with the service flow comprise instructions executable to send the data associated with the service flow to the anchor access service network over an R4 interface.

37. The handover controller of claim 34, wherein the instructions executable to initiate delivery of data associated with the service flow comprise instructions executable to send the data associated with the service flow to the target access service network.

38. The handover controller of claim 37, wherein the instructions executable to initiate delivery of data associated with the service flow comprise instructions executable to send the data associated with the service flow to the target access service network over an R8 interface.

* * * * *

UNITED STATES PATENT AND TRADEMARK OFFICE
CERTIFICATE OF CORRECTION

| | |
|---|---|
| PATENT NO. | : 8,472,406 B2 |
| APPLICATION NO. | : 13/241820 |
| DATED | : June 25, 2013 |
| INVENTOR(S) | : Chandra Sekhar Bontu et al. |

It is certified that error appears in the above-identified patent and that said Letters Patent is hereby corrected as shown below:

In the Claims:

Claim 31, Column 14, Line 63-64, please delete "wherein initiating wherein initiating" and substitute -- wherein initiating --

Claim 33, Column 15, Lines 5-6, please delete "wherein initiating wherein initiating" and substitute -- wherein initiating --

Signed and Sealed this
Fourteenth Day of January, 2014

Michelle K. Lee
*Deputy Director of the United States Patent and Trademark Office*